United States Patent
Cho et al.

(10) Patent No.: US 9,959,659 B2
(45) Date of Patent: May 1, 2018

(54) TILE-BASED RENDERING APPARATUS AND METHOD FOR RENDERING 3D GRAPHICS USING BINNING INFORMATION AND PROPERTY INFORMATION

(71) Applicant: SAMSUNG ELECTRONICS CO., LTD., Suwon-si (KR)

(72) Inventors: Yeongon Cho, Hwaseong-si (KR); Soojung Ryu, Hwaseong-si (KR); Jeongae Park, Seoul (KR); Woong Seo, Hwaseong-si (KR); Sangheon Lee, Hwaseong-si (KR); Seunghun Jin, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 1 day.

(21) Appl. No.: 14/962,648

(22) Filed: Dec. 8, 2015

(65) Prior Publication Data

US 2016/0163087 A1 Jun. 9, 2016

(30) Foreign Application Priority Data

Dec. 9, 2014 (KR) ........................ 10-2014-0175872

(51) Int. Cl.
*G06T 15/00* (2011.01)
*G06T 15/80* (2011.01)
(Continued)

(52) U.S. Cl.
CPC .............. *G06T 15/005* (2013.01); *G06T 1/60* (2013.01); *G06T 7/50* (2017.01); *G06T 11/40* (2013.01);
(Continued)

(58) Field of Classification Search
None
See application file for complete search history.

(56) References Cited

U.S. PATENT DOCUMENTS

| 7,450,120 B1 | 11/2008 | Hakura et al. |
| 2001/0022664 A1* | 9/2001 | Tsuchiya ................ G06K 15/00 358/1.12 |

(Continued)

FOREIGN PATENT DOCUMENTS

| EP | 1461773 B1 | 5/2010 |
| JP | 2001245162 A * | 9/2001 |
| JP | 4009808 B2 | 11/2007 |

OTHER PUBLICATIONS

The Extended European Search Report dated May 19, 2016 in counterpart European Application No. 15198677.5. (8 pages in English).

*Primary Examiner* — Michael J Cobb
(74) *Attorney, Agent, or Firm* — Harness, Dickey & Pierce, P.L.C.

(57) ABSTRACT

A tile-based rendering method includes performing binning of a current frame; generating an identification code of binning information or property information of a tile to be rendered in the current frame; comparing the identification code of the tile to be rendered to an identification code of a previous tile, wherein a location of the previous tile in a previous frame is the same as a location of the tile to be rendered in the current frame; and rendering the current frame by either re-using an image stored in a frame buffer or performing pixel processing of the tile to be rendered depending on a result of the comparing.

11 Claims, 9 Drawing Sheets

(51) Int. Cl.
  *G06T 1/60*     (2006.01)
  *G06T 17/20*    (2006.01)
  *G06T 11/40*    (2006.01)
  *G06T 7/50*     (2017.01)

(52) U.S. Cl.
  CPC .............. *G06T 15/80* (2013.01); *G06T 17/20* (2013.01); *G06T 2207/10024* (2013.01)

(56) References Cited

U.S. PATENT DOCUMENTS

| | | | |
|---|---|---|---|
| 2011/0102446 A1 | 5/2011 | Oterhals et al. | |
| 2011/0221743 A1* | 9/2011 | Keall | G06T 15/005 345/419 |
| 2011/0242113 A1* | 10/2011 | Keall | G06F 9/3857 345/505 |
| 2012/0176386 A1 | 7/2012 | Hutchins | |
| 2014/0071141 A1 | 3/2014 | Hunkins et al. | |
| 2014/0267300 A1* | 9/2014 | Barber | G06T 11/40 345/441 |
| 2014/0354682 A1* | 12/2014 | Heggelund | G06T 1/20 345/619 |
| 2015/0091892 A1 | 4/2015 | Kwon et al. | |
| 2015/0187123 A1 | 7/2015 | Hwang et al. | |
| 2016/0148424 A1* | 5/2016 | Chung | G06T 15/005 345/423 |
| 2016/0314557 A1* | 10/2016 | Croxford | G06T 1/60 |

\* cited by examiner

FIG. 2

| TILE 0 | TILE 1 | TILE 2 | TILE 3 | TILE 4 |
|---|---|---|---|---|
| TILE 5 | TILE 6 | TILE 7 | TILE 8 | TILE 9 |
| TILE 10 | TILE 11 | TILE 12 | TILE 13 | TILE 14 |
| TILE 15 | TILE 16 | TILE 17 | TILE 18 | TILE 19 |

FRAME #N

| TILE 0 | TILE 1 | TILE 2 | TILE 3 | TILE 4 |
|---|---|---|---|---|
| TILE 5 | TILE 6 | TILE 7 | TILE 8 | TILE 9 |
| TILE 10 | TILE 11 | TILE 12 | TILE 13 | TILE 14 |
| TILE 15 | TILE 16 | TILE 17 | TILE 18 | TILE 19 |

FRAME #N+1

| FRAME NUMBER | DRAW CALL NUMBER | GSTATE NUMBER | OPERATION |
|---|---|---|---|
| N | 0 | 0 | CLEAR |
| | 1 | 1 | DRAW TRIANGLE |
| | 2 | 2 | DRAW CIRCLE |
| N+1 | 0 | 0 | CLEAR |
| | 1 | 1 | DRAW TRIANGLE |
| | 2 | 2 | DRAW CIRCLE |

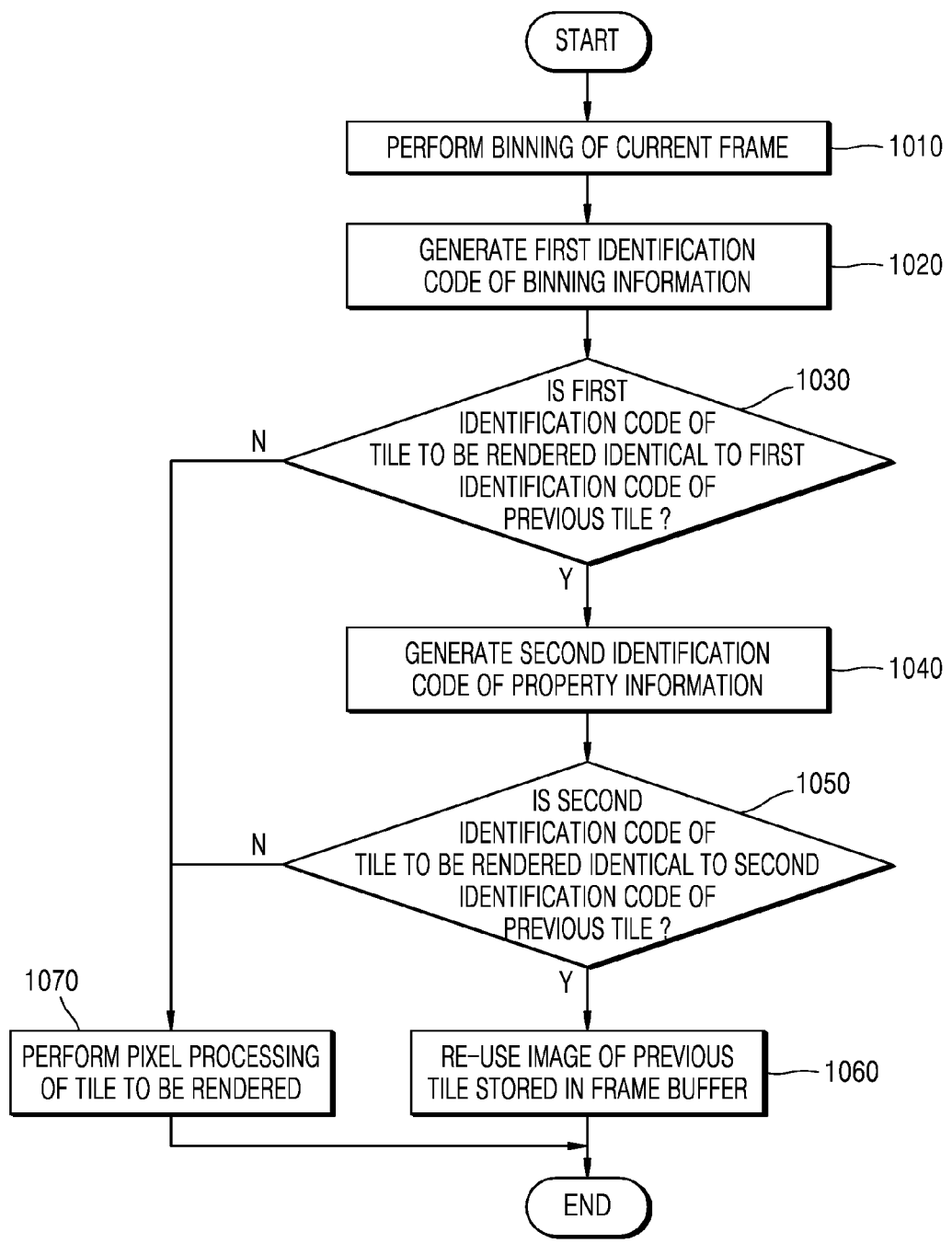

TILE-BASED RENDERING APPARATUS AND METHOD FOR RENDERING 3D GRAPHICS USING BINNING INFORMATION AND PROPERTY INFORMATION

CROSS-REFERENCE TO RELATED APPLICATION(S)

This application claims the benefit of Korean Patent Application No. 10-2014-0175872 filed on Dec. 9, 2014, in the Korean Intellectual Property Office, the entire disclosure of which is incorporated herein by reference for all purposes.

BACKGROUND

1. Field

This application relates to methods and apparatuses for rendering 3D data.

2. Description of Related Art

Examples of 3D graphics application program interface (API) standards include OpenGL, OpenGL ES, and Direct3D. The API standards include methods for rendering frames and displaying images. When each frame is rendered, many calculations are performed and a large amount of power is consumed. Therefore, it is desirable to reduce an amount of calculations and a number of times a memory is accessed during a rendering operation.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a tile-based rendering method includes performing binning of a current frame; generating an identification code of binning information or property information of a tile to be rendered in the current frame; comparing the identification code of the tile to be rendered to an identification code of a previous tile, wherein a location of the previous tile in a previous frame is the same as a location of the tile to be rendered in the current frame; and rendering the current frame by either re-using an image of the previous tile stored in a frame buffer or performing pixel processing of the tile to be rendered depending on a result of the comparing.

The generating may include generating a first identification code of the binning information.

The generating may include generating a first identification code of the binning information and a second identification code of the property information; and the comparing may include respectively comparing first and second identification codes of the tile to be rendered to first and second identification codes of the previous tile.

The comparing may further include skipping comparing the second identification codes in response to the first identification code of the tile to be rendered not being identical to the first identification code of the previous tile.

The rendering may include re-using the image of the previous tile stored in the frame buffer in response to the first and second identification codes of the tile to be rendered being identical to the first and second identification codes of the previous tile, respectively; and performing the pixel processing of the tile to be rendered in response to at least one of the first and second identification codes of the tile to be rendered not being identical to the first and second identification codes of the previous tile, respectively.

The generating may further include generating the first identification code based on a part of the binning information that indicates a list of primitives to be rendered in the tile to be rendered.

The generating may further include generating the second identification code based on a part of the property information that indicates any one or any combination of any two or more of an attribute, a Gstate, and a uniform of the tile to be rendered.

The rendering may include skipping the pixel processing of the tile to be rendered in response to the first and second identification codes of the tile to be rendered being identical to the first and second identification codes of the previous tile, respectively.

The generating may include generating an identification code of the tile to be rendered that is distinguishable from identification codes of other tiles that are not identical to the tile to be rendered using the binning information or the property information of the tile to be rendered.

In another general aspect, a non-transitory computer-readable storage medium stores instructions for causing computing hardware to perform the tile-based rendering method described above.

In another general aspect, a rendering device includes a geometry processor configured to perform binning of a current frame; an identical tile detector configured to generate an identification code of binning information or property information of a tile to be rendered in the current frame, and compare the identification code of the tile to be rendered to an identification code of a previous tile, wherein a location of the previous tile in a previous frame is the same as a location of the tile to be rendered in the current frame; and a pixel processor configured to render the current frame by either re-using an image of the previous tile stored in a frame buffer or performing pixel processing of the tile to be rendered depending on a result of the comparing.

The identical tile detector may be further configured to generate a first identification code of the binning information.

The identical tile detector may be further configured to generate a first identification code of the binning information and a second identification code of the property information; and respectively compare first and second identification codes of the tile to be rendered to first and second identification codes of the previous tile.

The identical tile detector may be further configured to skip comparing the second identification codes in response to the first identification code of the tile to be rendered not being identical to the first identification code of the previous tile.

The pixel processor may be further configured to re-use the image of the previous tile stored in the frame buffer in response to the first and second identification codes of the tile to be rendered being identical to the first and second identification codes of the previous tile, respectively; and perform the pixel processing of the tile to be rendered in response to at least one of the first and second identification codes of the tile to be rendered not being identical to the first and second identification codes of the previous tile, respectively.

The identical tile detector may be further configured to generate the first identification code based on a part of the binning information that indicates a list of primitives to be rendered in the tile to be rendered.

The identical tile detector may be further configured to generate the second identification code based on a part of the property information that indicates any one or any combination of any two or more of an attribute, a Gstate, and a uniform of the tile to be rendered.

The pixel processor may be further configured to skip the pixel processing of the tile to be rendered in response to the first and second identification codes of the tile to be rendered being identical to the first and second identification codes of the previous tile, respectively.

The identical tile detector may be further configured to generate an identification code of the tile to be rendered that is distinguishable from identification codes of other tiles that are not identical to the tile to be rendered using the binning information or the property information of the tile to be rendered.

In another general aspect, a rendering device includes an identical tile detector configured to detect whether a tile to be rendered in a current frame is identical to a previous tile in a previous frame based on rendering data of the tile to be rendered; and a pixel processor configured to render the tile to be rendered by re-using an image of the previous tile stored in a frame buffer as the tile to be rendered in response to the identical tile detector detecting that the tile to be rendered is identical to the previous tile, and render the current tile by performing pixel processing of the tile to be rendered based on the rendering data in response to the identical tile detector detecting that the tile to be rendered is not identical to the previous tile.

The rendering data may include binning information, an attribute, a Gstate, and a uniform of the tile to be rendered; and the identical tile detector may be further configured to detect whether the tile to be rendered is identical to the previous tile based on any one or any combination of any two or more of the binning information, the attribute, the Gstate, and the uniform.

The rendering device may further include a geometry processor configured to generate the binning information.

The identical tile detector may be further configured to generate a first identification code of the tile to be rendered based on the rendering data; compare the first identification code of the tile to be rendered to a first identification code previously generated for the previous tile based on rendering data of the previous tile, thereby obtaining a first comparison result; detect that the tile to be rendered is identical to the previous tile in response to the first comparison result being that the first identification code of the tile to be rendered is identical to the first identification code of the previous tile; and detect that the tile to be rendered is not identical to the previous tile in response to the first comparison result being that the first identification code of the tile to be rendered is not identical to the first identification code of the previous tile.

The identical tile detector may be further configured to generate a second identification code of the tile to be rendered based on the rendering data, the second identification code being different from the first identification data of the tile to be rendered; compare the second identification code of the tile to be rendered to a second identification code previously generated for the previous tile based on the rendering data of the previous tile, thereby obtaining a second comparison result; detect that the tile to be rendered is identical to the previous tile in response to the first comparison result being that the first identification code of the tile to be rendered is identical to the first identification code of the previous tile, and the second comparison result being that the second identification code of the tile to be rendered is identical to the second identification code of the previous tile; and detect that the tile to be rendered is not identical to the previous tile in response to the first comparison result being that the first identification code of the tile to be rendered is not identical to the first identification code of the previous tile, or the second comparison result being that the second identification code of the tile to be rendered is not identical to the second identification code of the previous tile.

The identical tile detector may be further configured to, in response to the first comparison result being that the first identification code of the tile to be rendered is not identical to the first identification code of the previous tile, skip the comparing of the second identification code of the tile to be rendered to the second identification code of the previous tile, and detect that the tile to be rendered is not identical to the previous tile.

The rendering data may include binning information of the tile to be rendered and property information of the tile to be rendered; and the identical tile detector may be further configured to generate the first identification code based on the binning information, and generate the second identification code of based on the property information.

The identical tile detector may be further configured to generate a first identification code of the tile to be rendered based on the rendering data; generate an attribute ID or a Gstate ID or a uniform ID of the tile to be rendered based on the rendering data, the attribute ID or the Gstate ID or the uniform ID being different from the first identification code; generate a second identification code of the tile to be rendered based on the rendering data, the second identification code being different from the first identification code and the attribute ID or the Gstate ID or the uniform ID; compare the first identification code of the tile to be rendered to a first identification code previously generated for the previous tile based on rendering data of the previous tile, thereby obtaining a first comparison result; detect that the tile to be rendered is not identical to the previous tile in response to the first comparison result being that the first identification code of the tile to be rendered is not identical to the first identification code of the previous tile; compare the attribute ID or the Gstate ID or the uniform ID of the tile to be rendered to an attribute ID or a Gstate ID or a uniform ID previously generated for the previous tile based on the rendering data of the previous tile in response to the first comparison result being that the first identification code of the tile to be rendered is identical to the first identification code of the previous tile, thereby obtaining a second comparison result; detect that the tile to be rendered is not identical to the previous tile in response to the second comparison result being that the attribute ID or the Gstate ID or the uniform ID of the tile to be rendered is not identical to the attribute ID or the Gstate ID or the uniform ID of the previous tile; compare the second identification code of the tile to be rendered to a second identification code previously generated for the previous tile based on the rendering data of the previous tile in response to the second comparison result being that the attribute ID or the Gstate ID or the uniform ID of the tile to be rendered is identical to the attribute ID or the Gstate ID or the uniform ID of the previous tile, thereby obtaining a third comparison result; detect that the tile to be rendered is not identical to the previous tile in response to the third comparison result being that the second identification code of the tile to be rendered is not identical to the second identification code of the previous tile; and detect that the tile to be rendered is identical to the previous tile in response to the first comparison result being that the first identification code of the tile to be rendered is identical to the first identification code of the previous tile, the second comparison result being that the attribute ID or the Gstate ID or the uniform ID of the tile to be rendered is identical to the attribute ID or the Gstate ID or the uniform ID of the previous tile, and the third comparison result being that the second identification code of the tile to be rendered is identical to the second identification code of the previous tile.

The identical tile detector may be further configured to transmit information indicating that an attribute or a Gstate or a uniform of the previous tile is identical to an attribute or a Gstate or a uniform of the tile to be rendered in response to the second comparison result being that the attribute ID or the Gstate ID or the uniform ID of the tile to be rendered is identical to the attribute ID or the Gstate ID or the uniform ID of the previous tile, and the third comparison result being that the second identification code of the tile to be rendered is not identical to the second identification code of the previous tile; and the pixel processor may be further configured to render the current tile by performing the pixel processing of the tile to be rendered based on the rendering data of the tile to be rendered and a result of rendering the previous tile in response to the information transmitted from the identical tile detector.

Other features and aspects will be apparent from the following detailed description, the drawings, and the claims.

BRIEF DESCRIPTION OF THE DRAWINGS

FIG. 2 is a diagram for describing an example of an operation of a rendering device.

FIG. 10 is a flowchart for describing another example of a rendering method.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Figure 1:
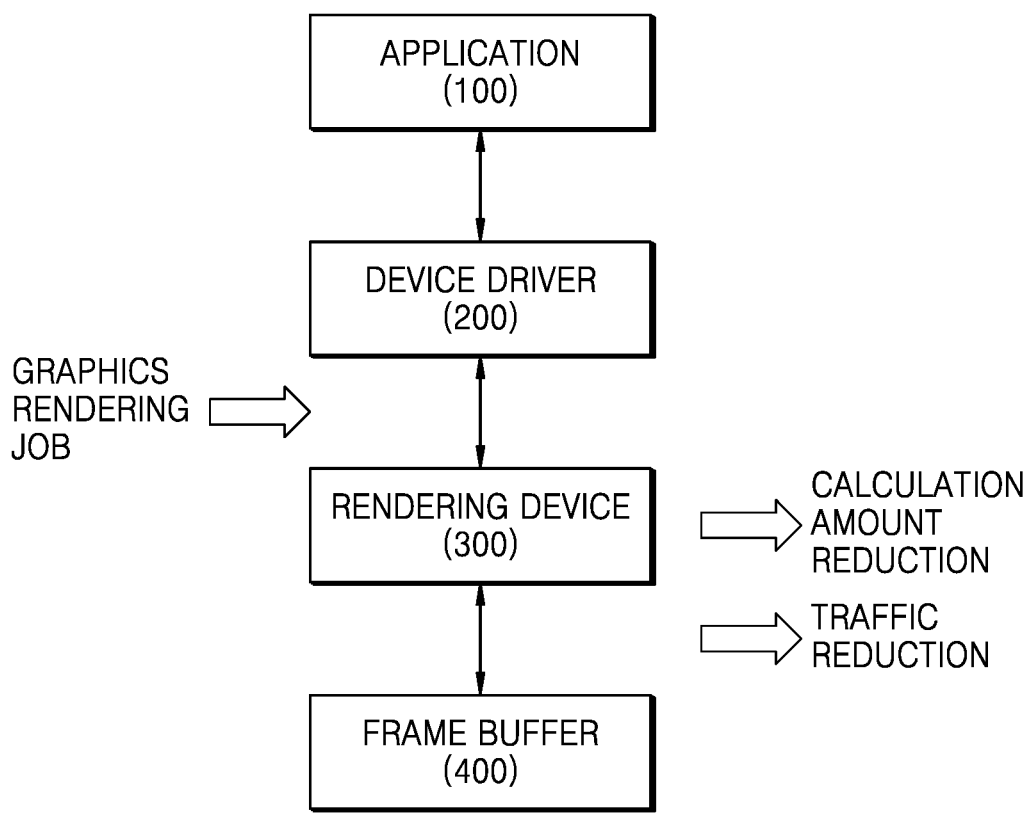
FIG. 1 is a diagram for describing an example of connections between devices.

FIG. 1 is a diagram for describing an example of connections between devices.

An application 100 is a program designed for performing a particular function.

The application 100 transmits commands related to image processing to a device driver 200. The application 100 may transmit commands of various forms to the device driver 200.

The device driver 200 outputs a graphics rendering job to a rendering device 300 according to a command received from the application 100.

The rendering device 300 is a graphics processing device. For example, the rendering device 300 may be a graphics processing unit (GPU).

The rendering device 300 generates an image based on the graphics rendering job received from the device driver 200 and outputs the generated image to the application 100.

The rendering device 300 renders a frame in tile units. A tile-based rendering method is a method of dividing a frame into a plurality of tiles and generating an image of each tile.

The frame buffer 400 stores an image of a frame. The frame buffer 400 is a type of memory. The frame buffer 400 stores images received from the rendering device 300.

In one example, the rendering device 300 reduces an amount of calculations by skipping pixel processing of identical tiles between different frames. In another example, the rendering device 300 reduces traffic between the rendering device 300 and the frame buffer 400 by skipping writing data to the frame buffer 400.

FIG. 2 is a diagram for describing an example of an operation of the rendering device 300. Referring to FIG. 2, the rendering device 300 renders an N+1th frame with reference to an Nth frame. In other words, if the N+1th frame includes a tile identical to a tile of the Nth frame, the rendering device 300 renders the N+1th frame by re-using a result of rendering the Nth frame.

In detail, FIG. 2 shows an Nth frame and an N+1th frame, where the Nth frame is a frame rendered before the N+1th frame. Each of the Nth frame and the N+1th frame includes 20 tiles Tile 0 through Tile 19. The Nth frame is a previous frame, that is, a most recently rendered frame, whereas the N+1th frame is a current frame. Tiles denoted by a same number indicate tiles at a same location. For example, Tile 7 of the Nth frame and Tile 7 of the N+1th frame are tiles at a same location.

Referring to the Nth frame, a triangle is displayed at Tile 1, Tile 5, Tile 6, and Tile 7, whereas a circle is displayed at Tile 12, Tile 13, Tile 17, and Tile 18. Referring to the N+1th frame, a triangle is displayed at Tile 1, Tile 5, Tile 6, and Tile 7, whereas a circle is displayed at Tile 13, Tile 14, Tile 18, and Tile 19. Referring to the 20 tiles of the Nth frame and the 20 tiles of the N+1th frame, Tile 0 through Tile 11, Tile 15, and Tile 16 of the Nth frame are identical to Tile 0 through Tile 11, Tile 15, and Tile 16 of the N+1th frame. However, Tile 12 through Tile 14 and Tile 17 through Tile 19 of the Nth frame are different from Tile 12 through Tile 14 and Tile 17 through Tile 19 of the N+1th frame, respectively.

For tiles of the N+1th frame displaying the same images as corresponding tiles of the Nth frame, the rendering device 300 re-uses images generated by rendering the corresponding tiles of the Nth frame. Therefore, among tiles of the N+1th frame, the rendering device 300 renders Tile 0 through Tile 11, Tile 15, and Tile 16 by re-using images generated by rendering Tile 0 through Tile 11, Tile 15, and Tile 16 of the Nth frame, and renders the remaining tiles Tile 12 through Tile 14 and Tile 17 through Tile 19 by performing pixel processing of the remaining tiles.

Figures 3, 4:
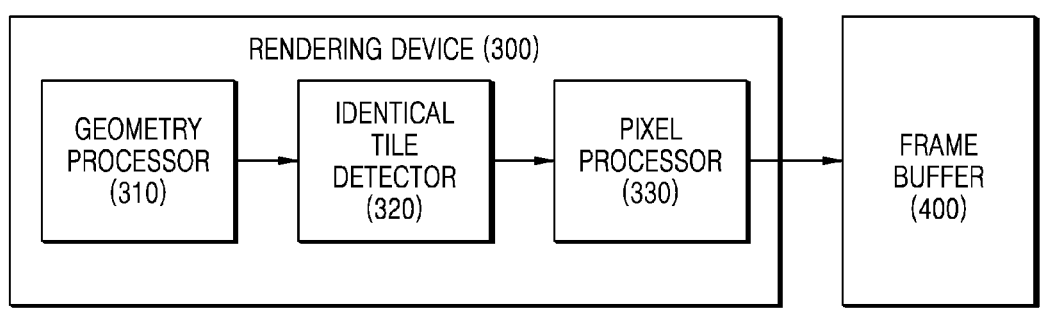
FIG. 3 is a diagram for describing an example of a draw call input in frame units.
FIG. 4 is a diagram for describing an example of a rendering device.

FIG. 3 is a diagram for describing an example of a draw call input in frame units. Referring to FIG. 3, the rendering device 300 receives an instruction in a form as shown in FIG. 3 and performs a rendering.

A frame number indicates a sequence of frames, and a draw call is an instruction indicating an image to render for a frame. A Gstate (graphics state) is allocated to each draw call. An operation indicates a content of each draw call. A number assigned to the draw call and a number assigned to the Gstate are independent of each other.

The rendering device 300 receives three draw calls for an Nth frame and performs the operations included in the draw calls. The rendering device 300 performs a clear operation when a 0th draw call is received, draws a triangle when a 1st draw call is received, and draws a circle when a 2nd draw call is received. Each draw call includes a Gstate, and the Gstate indicates a graphics effect applied when the rendering device 300 performs an operation included in a draw call. The rendering device 300 renders an N+1th frame in the same manner in which the rendering device 300 renders the Nth frame.

FIG. 3 shows a case in which an instruction received for the N+1th frame is identical to an instruction received for the Nth frame. Therefore, the rendering device 300 may re-use a result of rendering the Nth frame for rendering the N+1th frame.

FIG. 4 is a diagram for describing an example of the rendering device 300. Referring to FIG. 4, the rendering device 300 includes a geometry processor 310, an identical tile detector 320, and a pixel processor 330.

The geometry processor 310 performs binning of a current frame. The geometry processor 310 divides a current frame into at least one tile and performs binning of the tile. A tile is a portion of a frame, and the rendering device 300 generates images in tile units. The geometry processor 310 performs binning of a tile to indicate which primitives are to be processed for the tile. For example, the geometry processor 310 may allocate numbers or IDs to primitives included in each tile to indicate which primitives are to be processed.

The identical tile detector 320 generates an identification code of binning information or property information of a tile to be rendered. The identification code of the tile to be rendered is distinguishable from identification codes of other tiles that are different from the tile to be rendered, and is unique data.

The identical tile detector 320 generates a first identification code of binning information of a tile to be rendered or a second identification code of property information of the tile to be rendered. The binning information and the property information constitute rendering data for rendering the tile to be rendered, thus the first identification code and the second identification code are generated based on the rendering data. The identical tile detector 320 generates a first identification code or a second identification code unique to a tile to be rendered using binning information or property information of the tile to be rendered, and the first identification code and the second identification code are distinguishable from a first identification code and a second identification code of other tiles that are different from the tile to be rendered. For example, a first identification code may be a representative value of binning information, whereas a second identification code may be a representative value of property information. First and second identification codes may be generated using a method of generating an error detecting code (for example, CRC) of binning information or property information, for example.

The identical tile detector 320 generates a first identification code using binning information that indicates a list of primitives of a tile to be rendered. When a tile is changed, binning information is also changed, and thus a first identification code is also changed.

The identical tile detector 320 generates a second identification code of a tile to be rendered using property information indicating any one or any combination of any two or more of attributes, a Gstate, and uniforms of the tile to be rendered. The attributes include, for example, a location of a vertex, a direction of the vertex, coordinates of a texture, and connection information. The Gstate indicates a graphics state of the tile to be rendered, and the uniforms indicate an effect to be uniformly applied to the tile to be rendered. For example, the uniforms indicate effects including, for example, reflectance, transmittance, and blur.

The identical tile detector 320 compares an identification code of a tile to be rendered to an identification code of a previous tile. The tile to be rendered is a tile included in a current frame, whereas the previous tile is a tile included in a previously rendered frame. In other words, the previous tile is a tile included in a frame that was most recently rendered prior to the current frame to be rendered. The identical tile detector 320 compares identification codes of tiles in a current frame and a same location in a previous frame. The identical tile detector 320 compares a first identification code of a tile to be rendered in a current frame to a first identification code of a previous tile at a same location. If the first identification codes are identical to each other, the identical tile detector 320 compares a second identification code of the tile to be rendered to a second identification code of the previous tile. If the first identification codes are not identical to each other, the identical tile detector 320 skips comparing the second identification codes.

Depending on a result of the comparing in the identical tile detector 320, the pixel processor 330 renders a current frame by either re-using an image of a previous tile stored in a frame buffer, or performing pixel processing of a tile to be rendered. If both a first identification code and a second identification code of a tile to be rendered are identical to a first identification code and a second identification code of a previous tile, the pixel processor 330 re-uses an image corresponding to the previous tile. In other words, if there is a previous tile with first and second identification codes identical to first and second identification codes of a tile to be rendered, the pixel processor 330 skips pixel processing of the tile to be rendered, and re-uses an image corresponding to the previous tile stored in the frame buffer 400. If either one or both of a first identification code and a second identification code of a tile to be rendered is not identical to a first identification code and a second identification code of the previous tile, respectively, the pixel processor 330 performs pixel processing of the tile to be rendered.

The frame buffer 400 stores a rendered image. The frame buffer 400 may store images in frame units or tile units, and outputs images according to an instruction from the application 100.

Figure 5:
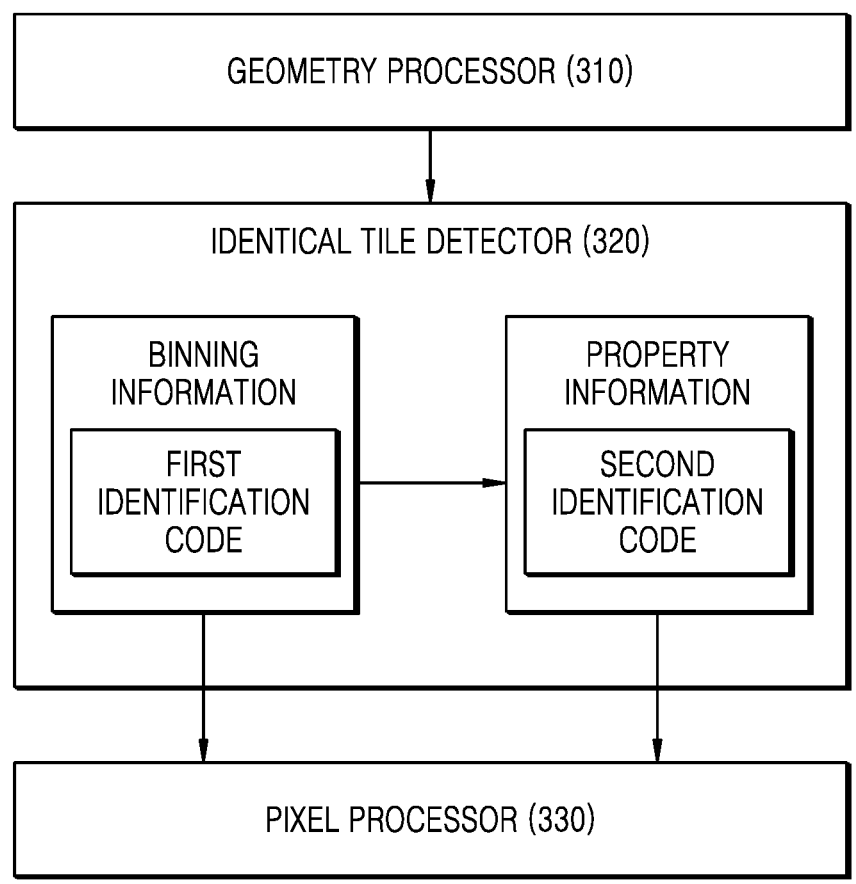
FIG. 5 is a diagram for describing an example of an operation of an identical tile detector of FIG. 4.

FIG. 5 is a diagram for describing an example of an operation of the identical tile detector 320 of FIG. 4. Referring to FIG. 5, the identical tile detector 320 determines whether two tiles are identical using first identification codes and second identification codes.

The identical tile detector 320 determines whether a first or second identification code of a tile to be rendered is identical to a first or second identification code of a previous tile, wherein a location of the previous tile is the same as a location of the tile to be rendered. The identical tile detector 320 compares a first identification code of the tile to be rendered to a first identification code of the previous tile, wherein a location of the previous tile is the same as a location of the tile to be rendered, and if the first identification codes are identical to each other, compares a second identification code of the tile to be rendered to a second identification code of the previous tile. In other words, if the first identification codes are not identical to each other, the identical tile detector 320 skips comparing the second identification codes.

Figure 6:
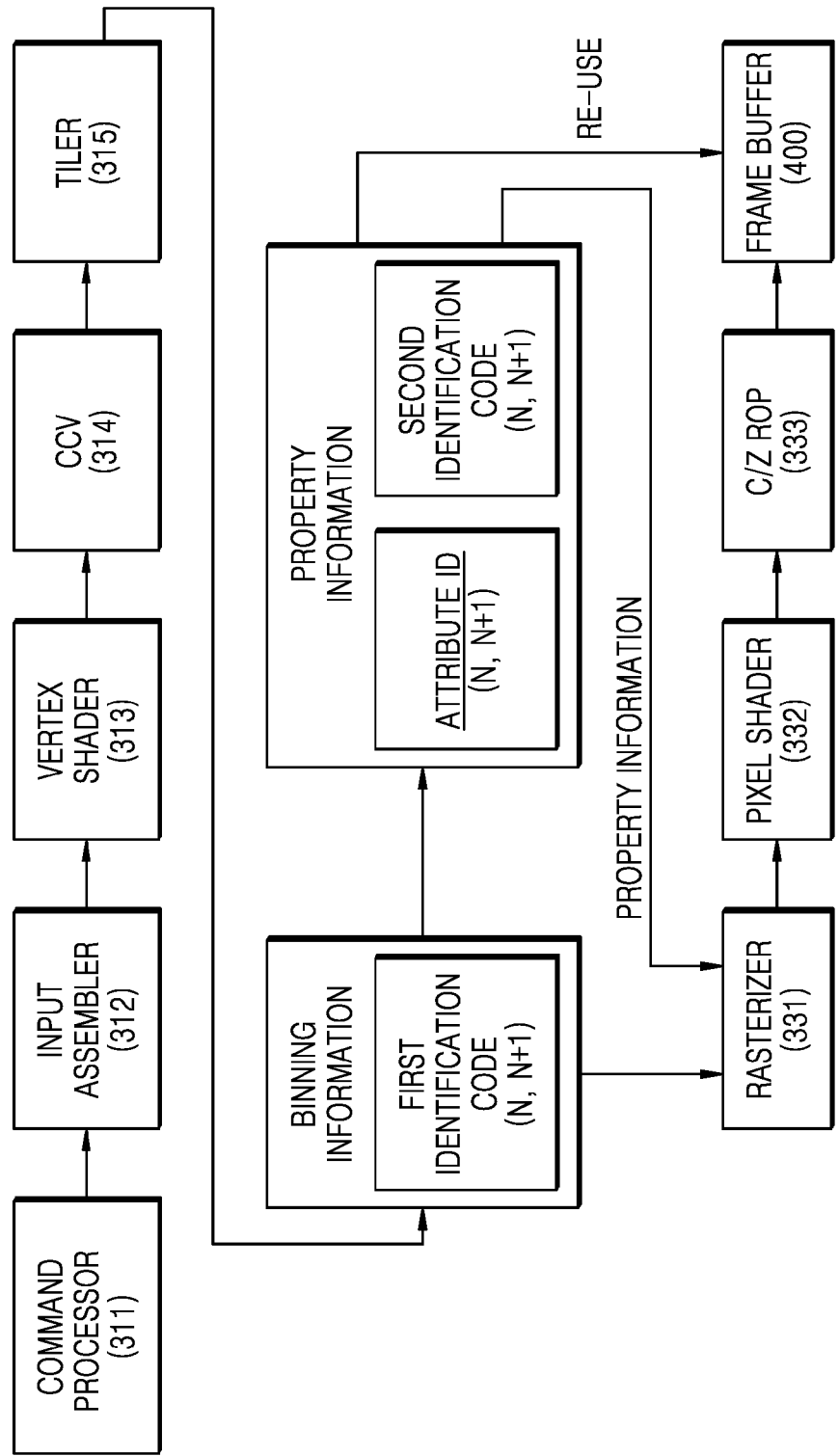
FIG. 6 is a diagram for describing an example of a rendering method.

FIG. 6 is a diagram for describing an example of a rendering method. Referring to FIG. 6, the rendering device 300 primarily determines whether two tiles are identical using attribute information. The rendering device 300 primarily determines whether two tiles are identical based on attribute IDs in property information. The attribute IDs are issued by the device driver 200. If a first identification code of a tile to be rendered is identical to a first identification code of a previous tile, the rendering device 300 compares an attribute ID of the tile to be rendered to an attribute ID of the previous tile. The rendering device 300 prioritizes determination of whether two attribute IDs are identical over determination of whether two second identification codes are identical. If an attribute ID of a previous tile is identical to an attribute ID of a tile to be rendered, the rendering device 300 compares a second identification code of the previous tile to a second identification code of the tile to be rendered. If all of the first identification code, the attribute ID, and the second identification code of the previous tile are identical to the first identification code, the attribute ID, and the second identification code of the tile to be rendered, respectively, the rendering device 300 re-uses an image of an Nth frame stored in a frame buffer. If not, the rendering device 300 performs pixel processing of the tile to be rendered. However, if attribute IDs of a previous tile and a tile to be rendered are identical to each other, but second identification codes of the previous tile and the tile to be rendered are different from each other, the rendering device 300 renders the tile to be rendered using a property corresponding to the attribute that is the same for the previous tile and the tile to be rendered. Therefore, the identical tile detector 320 transmits information indicating that the attribute of the previous tile is identical to the attribute of the tile to be rendered to the pixel processor 330. The pixel processor 330 performs pixel processing of the tile to be rendered using a property that may be applied when attributes of the previous tile and the tile to be rendered are identical to each other based on a result of rendering the previous frame. For example, if a texture command, texturing related attributes, and a Gstate within whole attributes and Gstates are the same for the same tile in the current frame or tile and the previous frame or tile, the pixel processor 330 can skip the texture operations. In order to reuse previous texture results, a texture unit needs to store the outputs.

A command processor 311, an input assembler 312, a vertex shader 313, a CCV, and a tiler 315 are elements included in the geometry processor 310. A rasterizer 331, a pixel shader 332, and a C/Z ROP 333 are elements included in the pixel processor 330. These elements are well known to one of ordinary skill in the art, but brief descriptions thereof have nevertheless been provided below.

The input assembler 312 reads primitive data (points, lines, and/or triangles) from user-filled buffers and assembles the data into primitives that will be used by the subsequent stages. The input assembler 312 can assemble vertices into several different primitive types (such as line lists, triangle strips, or primitives with adjacency).

The vertex shader 313 transforms each vertex's 3D position in virtual space to the 2D coordinates at which it appears on the screen and a depth value for a Z-buffer. The vertex shader 313 can manipulate properties such as position, color, and texture coordinates, but cannot create new vertices.

The CCV 314 is a Clip, Cull, and Viewport unit that receives primitive data from the vertex shader 313 and generates primitives ready for rendering. The CCV 314 receives vertices in clip coordinates and information that the CCV 314 uses to convert the vertices into primitives in screen space coordinates.

The tiler 315 receives screen space X and Y locations for the vertices of a point, line, or triangle, and outputs data structures indicating which of the input primitives potentially intersects each tile.

The rasterizer 331 converts an image described in a vector graphics format (shapes) into a raster image (pixels or dots) for output on a video display or printer, or for storage in a bitmap file format.

The pixel shader 332, also known as a fragment shader, computes color and other attributes of each fragment, which is typically a single pixel. The simplest pixel shader outputs one screen pixel as a color value, but more complex shaders with multiple inputs/outputs are also possible.

The C/Z ROP (Color/Depth Raster Operation) 333 computes the final color and depth values that are written to the render target, which may be referred to as color/depth buffers.

Figure 7:
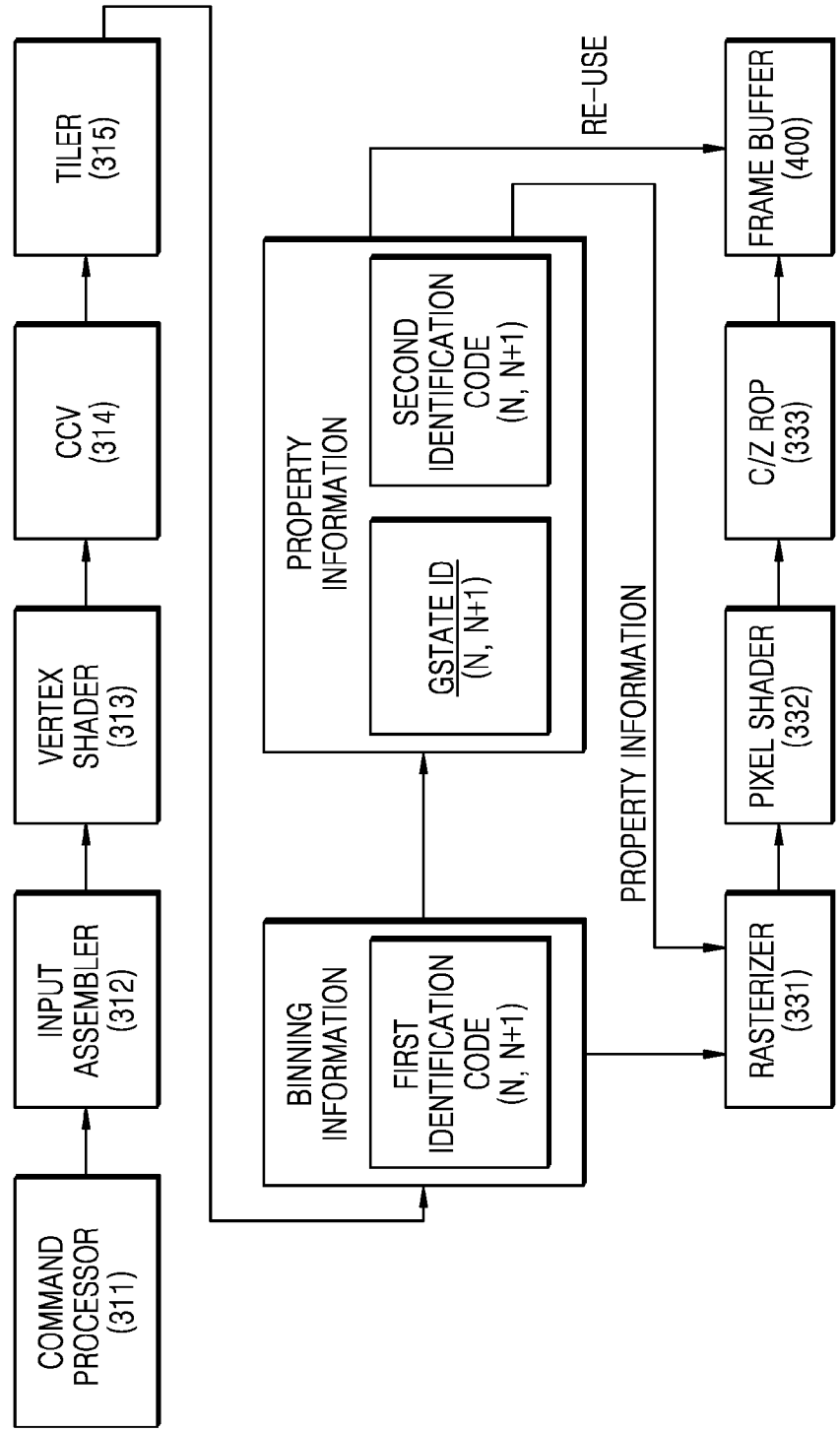
FIG. 7 is a diagram for describing another example of a rendering method.

FIG. 7 is a diagram for describing another example of a rendering method. Referring to FIG. 7, the rendering device 300 primarily determines whether two tiles are identical using Gstate information. The rendering device 300 primarily determines whether two tiles are identical using Gstate IDs in property information. The rendering device 300 determines whether a first identification code of a tile to be rendered is identical to a first identification code of a previous tile, and if the first identification code of the tile to be rendered is identical to the first identification code of the previous tile, compares a Gstate ID of the tile to be rendered to a Gstate ID of the previous tile. A Gstate ID is issued by the device driver 200. The rendering device 300 prioritizes determining whether two Gstate IDs are identical over determining whether two second identification codes are identical. If a Gstate ID of a previous tile is identical to a Gstate ID of a tile to be rendered, the rendering device 300 compares a second identification code of the previous tile to a second identification code of the tile to be rendered. If all of the first identification code, the Gstate ID, and the second identification code of the previous tile are identical to the first identification code, the Gstate ID, and the second identification code of the tile to be rendered, respectively, the rendering device 300 re-uses an image of an Nth frame stored in a frame buffer. If not, the rendering device 300 performs pixel processing of the tile to be rendered. However, if Gstate IDs of a previous tile and a tile to be rendered are identical to each other, but second identification codes of the previous tile and the tile to be rendered are different from each other, the rendering device 300 renders the tile to be rendered using a property corresponding to the Gstate that is the same for the previous tile and the tile to be rendered. Therefore, the identical tile detector 320 transmits information indicating that the Gstate of a previous tile is identical to the Gstate of a tile to be rendered to the pixel processor 330. The pixel processor 330 performs pixel processing of the tile to be rendered using a property that may be applied when Gstates of the previous tile and the tile to be rendered are identical to each other based on a result of rendering the previous frame.

Figure 8:
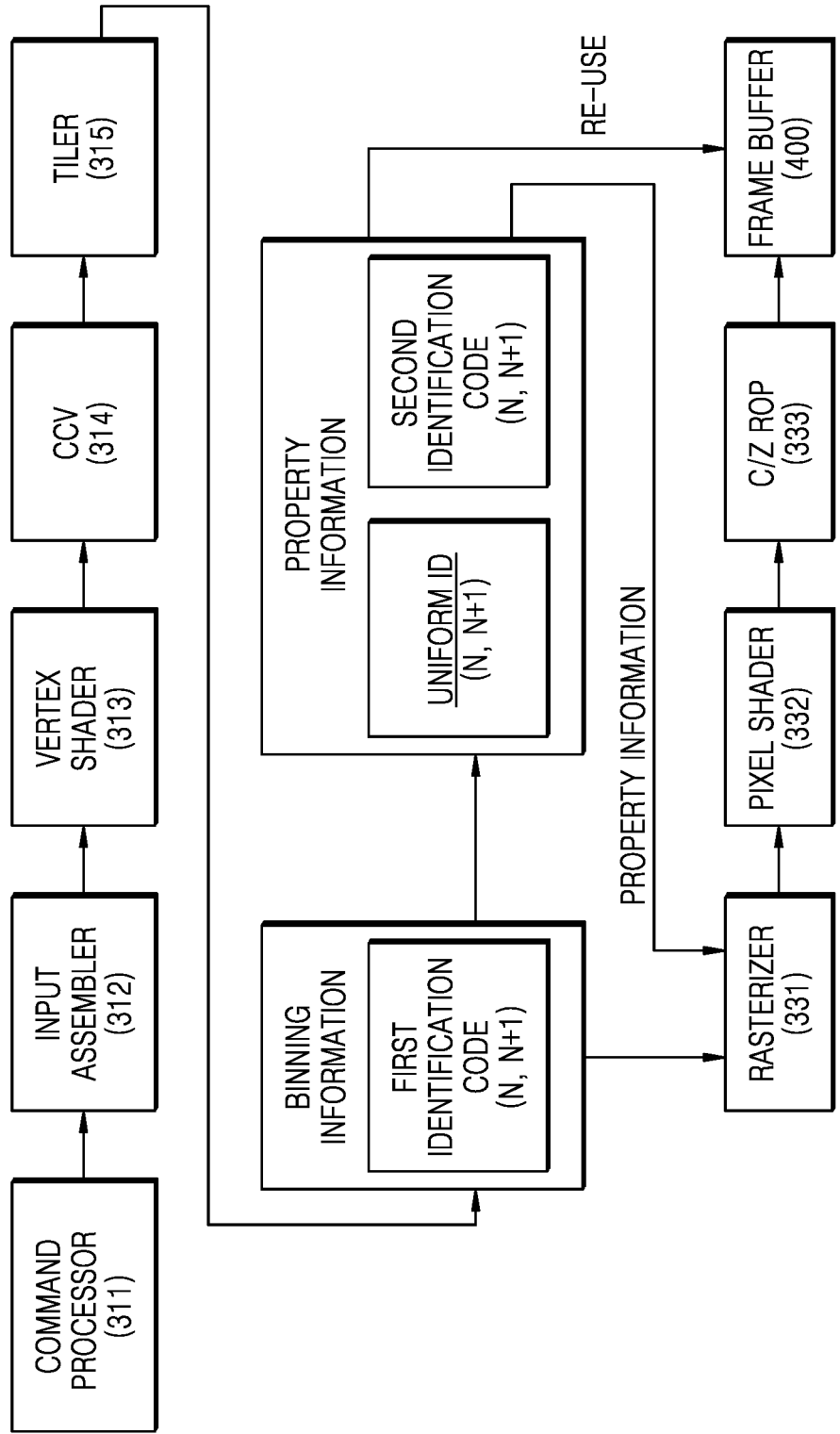
FIG. 8 is a diagram for describing another example of a rendering method.

FIG. 8 is a diagram for describing another example of a rendering method. Referring to FIG. 8, the rendering device 300 primarily determines whether two tiles are identical using uniform information. The rendering device 300 primarily determines whether two tiles are identical using uniform IDs in property information. The rendering device 300 determines whether a first identification code of a tile to be rendered is identical to a first identification code of a previous tile, and if the first identification code of the tile to be rendered is identical to the first identification code of the previous tile, compares a uniform ID of the tile to be rendered to a uniform ID of the previous tile. A uniform ID is issued by the device driver 200. The rendering device 300 prioritizes determining whether two uniform IDs are identical over determining whether two second identification codes are identical. If a uniform ID of a previous tile is identical to a uniform ID of a tile to be rendered, the rendering device 300 compares a second identification code of the previous tile to a second identification code of the tile to be rendered. If all of the first identification code, the uniform ID, and the second identification code of the previous tile are identical to the first identification code, the uniform ID, and the second identification code of the tile to be rendered, respectively, the rendering device 300 re-uses an image of an Nth frame stored in a frame buffer. If not, the rendering device 300 performs pixel processing of the tile to be rendered. However, if uniform IDs of a previous tile and a tile to be rendered are identical to each other, but second identification codes of the previous tile and the tile to be rendered are different from each other, the rendering device 300 renders the tile to be rendered using a property corresponding to the uniform that is the same for the previous tile and the tile to be rendered. Therefore, the identical tile detector 320 transmits information indicating that the uniform of a previous tile is identical to the uniform of a tile to be rendered to the pixel processor 330. The pixel processor 330 performs pixel processing of the tile to be rendered using a property that may be applied when uniforms of the previous tile and the tile to be rendered are identical to each other based on a result of rendering the previous frame.

Figure 9:
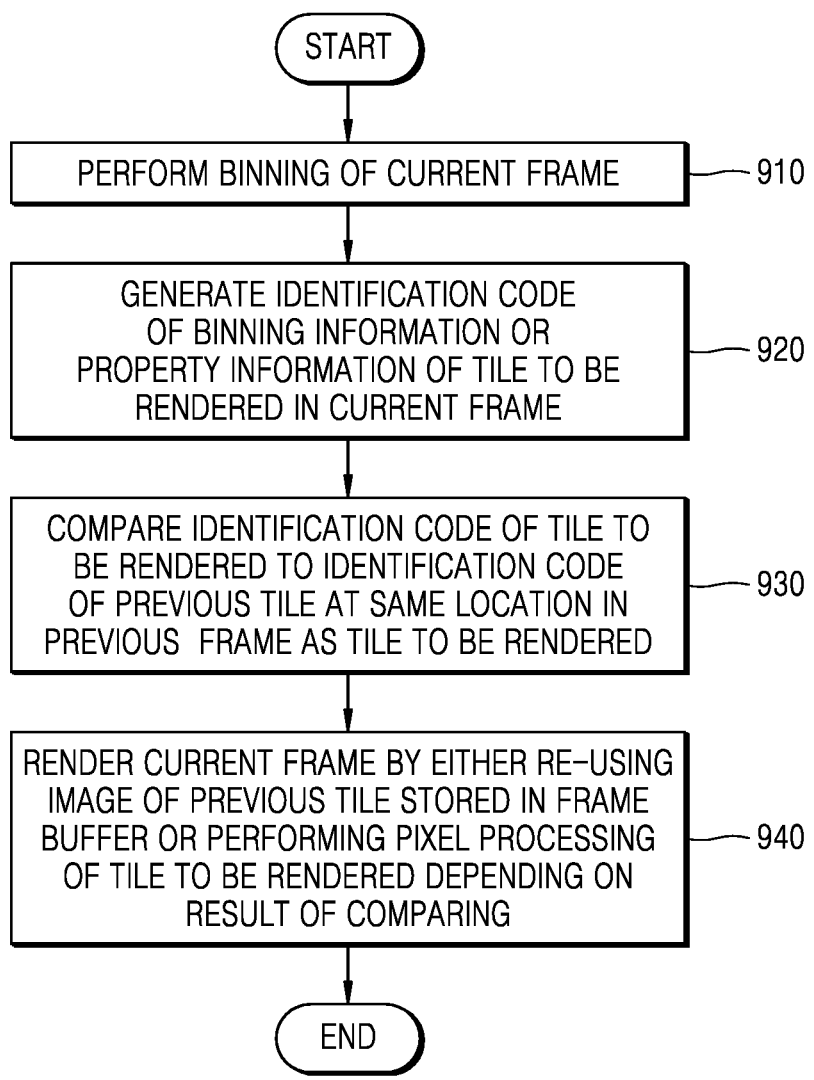
FIG. 9 is a flowchart for describing an example of a rendering method.

FIG. 9 is a flowchart for describing an example of a rendering method. Referring to FIG. 9, the rendering device 300 renders a current frame using a result of rendering a previous frame.

In operation 910, the rendering device 300 performs binning of a current frame. The current frame is a frame currently being rendered by the rendering device 300. The rendering device 300 performs binning tiles and generates respective lists of primitives included in the tiles.

In operation 920, the rendering device 300 generates an identification code of binning information or property information of a tile to be rendered in a current frame. The rendering device 300 generates either a first identification code of binning information or a second identification code of property information, or both first and second identification codes. Furthermore, the rendering device 300 may generate an identification code of binning information and property information.

In operation 930, the rendering device 300 compares an identification code of a tile to be rendered to an identification code of a previous tile, where a location of the previous tile is the same as a location of the tile to be rendered. For example, the rendering device 300 compares an identification code generated using binning information or property information of a tile to be rendered to an identification code generated using binning information or property information of a previous tile. Alternatively, the rendering device 300 compares a first identification code of binning information of a tile to be rendered to a first identification code of binning information of a previous tile, and if the first identification codes are identical to each other, compares a second identification code of property information of the tile to be rendered to a second identification code of property information of the previous tile.

In operation 940, based on a result of the comparison, the rendering device 300 renders a current frame by re-using an image stored in a frame buffer or performing pixel processing of the tile to be rendered. If identification codes of the previous tile and the tile to be rendered are identical to each other, the rendering device 300 re-uses a result of rendering the previous tile. If not, the rendering device 300 performs pixel processing of the tile to be rendered. Furthermore, if both of the first identification code and the second identification code of the tile to be rendered are identical to the first identification code and the second identification code of the previous tile, the rendering device 300 re-uses a result of rendering the previous frame. If either of the first identification code and the second identification code of the tile to be rendered is not identical to either of the first identification code and the second identification code of the previous tile, the rendering device 300 performs pixel processing of the tile to be rendered.

FIG. 10 is a flowchart for describing another example of a rendering method according to an embodiment. Referring to FIG. 10, the rendering device 300 determines whether two tiles are identical based on identification information of the tiles.

In operation 1010, the rendering device 300 performs binning of a current frame. In operation 1020, the rendering device 300 generates a first identification code of binning information.

In operation 1030, the rendering device 300 compares the first identification code of a tile to be rendered to the first identification code of a previous tile, wherein a location of the previous tile is the same as a location of the tile to be rendered. If the first identification code of the tile to be rendered is identical to the first identification code of the previous tile, the method proceeds to operation 1040. If not, the method proceeds to operation 1070.

In operation 1040, the rendering device 300 generates a second identification code of property information. If the first identification code of the tile to be rendered is identical to the first identification code of the previous tile, the rendering device 300 generates second identification code. Although FIG. 10 shows that operation 1040 is performed after operation 1030, operation 1040 may alternatively be performed before or after operation 1020 or simultaneously with operation 1020.

In operation 1050, the rendering device 300 compares the second identification code of the tile to be rendered to the second identification code of the previous tile. If the second identification codes are identical to each other, the method proceeds to operation 1060. If not, the operation proceeds to operation 1070.

In operation 1060, the rendering device 300 re-uses an image stored in a frame buffer. Since the tile to be rendered is identical to the previous tile, the rendering device 300 re-uses a result image generated by rendering the previous tile in the previous frame, thereby skipping pixel processing of the tile to be rendered.

In operation 1070, since the first identification codes are not identical to each other, the rendering device 300 performs pixel processing of the tile to be rendered.

The examples of the rendering device 300 described above re-use a result of pixel processing of a previous tile identical to a tile to be rendered, thereby reducing an amount of calculations for the tile to be rendered.

The examples of the rendering device 300 described above determine whether a current tile and a previous tile are identical using binning information of the current tile and the previous tile.

The examples of the rendering device 300 described above re-use an image of a previous tile stored in the frame buffer 400 for a current tile, thereby reducing traffic between the rendering device 300 and the frame buffer 400.

The application 100 and the device driver 200 in FIG. 1, the rendering device 300 in FIGS. 1 and 3, the frame buffer 400 in FIGS. 1, 4, and 6-8, the geometry processor 310, the identical tile detector 320, and the pixel processor in FIGS. 4 and 5, and the command processor 311, the input assembler 312, the vertex shader 313, the CCV 314, and tiler 315, the rasterizer 331, the pixel shader 332, and the C/Z ROP 333 in FIGS. 6-8 that perform the operations described herein with respect to FIGS. 1-10 are implemented by hardware components. Examples of hardware components include controllers, generators, drivers, memories, comparators, arithmetic logic units, adders, multipliers, and any other electronic components known to one of ordinary skill in the art. In one example, the hardware components are implemented by computing hardware, for example, by one or more processors or computers. A processor or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known to one of ordinary skill in the art that is capable of responding to and executing instructions in a defined manner to achieve a desired result. In one example, a processor or computer includes, or is connected to, one or more memories storing instructions or software that are executed by the processor or computer. Hardware components implemented by a processor or computer execute instructions or software, such as an operating system (OS) and one or more software applications that run on the OS, to perform the operations described herein with respect to FIGS. 1-10. The hardware components also access, manipulate, process, create, and store data in response to execution of the instructions or software. For simplicity, the singular term "processor" or "computer" may be used in the description of the examples described herein, but in other examples multiple processors or computers are used, or a processor or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 9 and 10 that perform the operations described herein with respect to FIGS. 1-10 are performed by a processor or a computer as described above executing instructions or software to perform the operations described herein.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A tile-based rendering method for rendering 3D graphics using a graphics processing unit, the method comprising:
    performing, using at least one processor, binning of a current frame of an input image, the current frame including a plurality of tiles;
    generating, using the at least one processor, a first identification code of binning information of a tile to be rendered in the current frame and a second identification code of property information of the tile to be rendered, the property information based on a graphics-related property of the tile to be rendered, the binning information based on a list of primitives to be rendered in the tile to be rendered;
    comparing, using the at least one processor, the first identification code of the tile to be rendered to first identification code of a previous tile, wherein a location of the previous tile in a previous frame is the same as a location of the tile to be rendered in the current frame, and
        in response to the first identification code of the tile to be rendered being identical to a first identification code of a previous frame, comparing the second identification code of the tile to be rendered to a second identification code of the previous tile, and
        in response to the first identification code of the tile to be rendered not being identical to the first identification code of the previous tile, not comparing the second identification codes of the tile to be rendered and the previous tile; and
    rendering, using the at least one processor, the current frame by either re-using an image of the previous tile stored in a frame buffer or performing pixel processing of the tile to be rendered depending on a result of the comparing, the rendering including,
        re-using the image of the previous tile stored in the frame buffer in response to the first and second identification codes of the tile to be rendered being identical to the first and second identification codes of the previous tile, respectively, and
        performing the pixel processing of the tile to be rendered in response to at least one of the first and second identification codes of the tile to be rendered not being identical to the first and second identification codes of the previous tile, respectively.

2. The tile-based rendering method of claim 1, wherein the generating further comprises generating the first identification code based on a result of error detection performed using the binning information.

3. The tile-based rendering method of claim 1, wherein the generating further comprises generating the second identification code based on a part of the property information that indicates any one or any combination of any two or more of an attribute, a Gstate, and a uniform of the tile to be rendered.

4. The tile-based rendering method of claim 1, wherein the rendering comprises skipping the pixel processing of the tile to be rendered in response to the first and second identification codes of the tile to be rendered being identical to the first and second identification codes of the previous tile, respectively.

5. The tile-based rendering method of claim 1, wherein the generating comprises generating first and second identification codes of the tile to be rendered that are distinguishable from first and second identification codes of other tiles that are not identical to the tile to be rendered using the binning information and the property information of the tile to be rendered.

6. A non-transitory computer-readable storage medium storing instructions that, when executed by the at least one processor, cause the at least one processor to perform the method of claim 1.

7. A rendering device for rendering 3D graphics, the rendering device comprising:
    at least one processor configured to,
        perform binning of a current frame of an input image, the current frame including a plurality of tiles,
        generate a first identification code of binning information of a tile to be rendered in the current frame and a second identification code of property information of the tile to be rendered, the property information based on a graphics-related property of the tile to be rendered, the binning information based on a list of primitives to be rendered in the tile to be rendered,
        compare the first identification code of the tile to be rendered to first identification code of a previous tile, wherein a location of the previous tile in a previous frame is the same as a location of the tile to be rendered in the current frame, the comparing including,
            in response to the first identification code of the tile to be rendered being identical to first identification code of the previous tile, comparing the second identification code of the tile to be rendered to a second identification code of the previous tile, and
            in response to the first identification code of the tile to be rendered not being identical to the first identification code of the previous tile, not comparing the second identification codes of the tile to be rendered and the previous tile; and
        render the current frame by either re-using an image of the previous tile stored in a frame buffer or performing pixel processing of the tile to be rendered depending on a result of the comparing, the rendering including,
            re-using the image of the previous tile stored in the frame buffer in response to the first and second identification codes of the tile to be rendered being identical to the first and second identification codes of the previous tile, respectively, and
            performing the pixel processing of the tile to be rendered in response to at least one of the first and second identification codes of the tile to be rendered not being identical to the first and second identification codes of the previous tile, respectively.

8. The rendering device of claim 7, wherein the at least one processor is further configured to generate the first identification code based on a result of error detection performed using the binning information.

9. The rendering device of claim 7, wherein the at least one processor is further configured to generate the second identification code based on a part of the property information that indicates any one or any combination of any two or more of an attribute, a Gstate, and a uniform of the tile to be rendered.

10. The rendering device of claim 7, wherein the at least one processor is further configured to skip the pixel processing of the tile to be rendered in response to the first and second identification codes of the tile to be rendered being identical to the first and second identification codes of the previous tile, respectively.

11. The rendering device of claim 7, wherein the at least one processor is further configured to generate first and second identification codes of the tile to be rendered that are distinguishable from first and second identification codes of other tiles that are not identical to the tile to be rendered using the binning information and the property information of the tile to be rendered.

* * * * *